Figure 1:
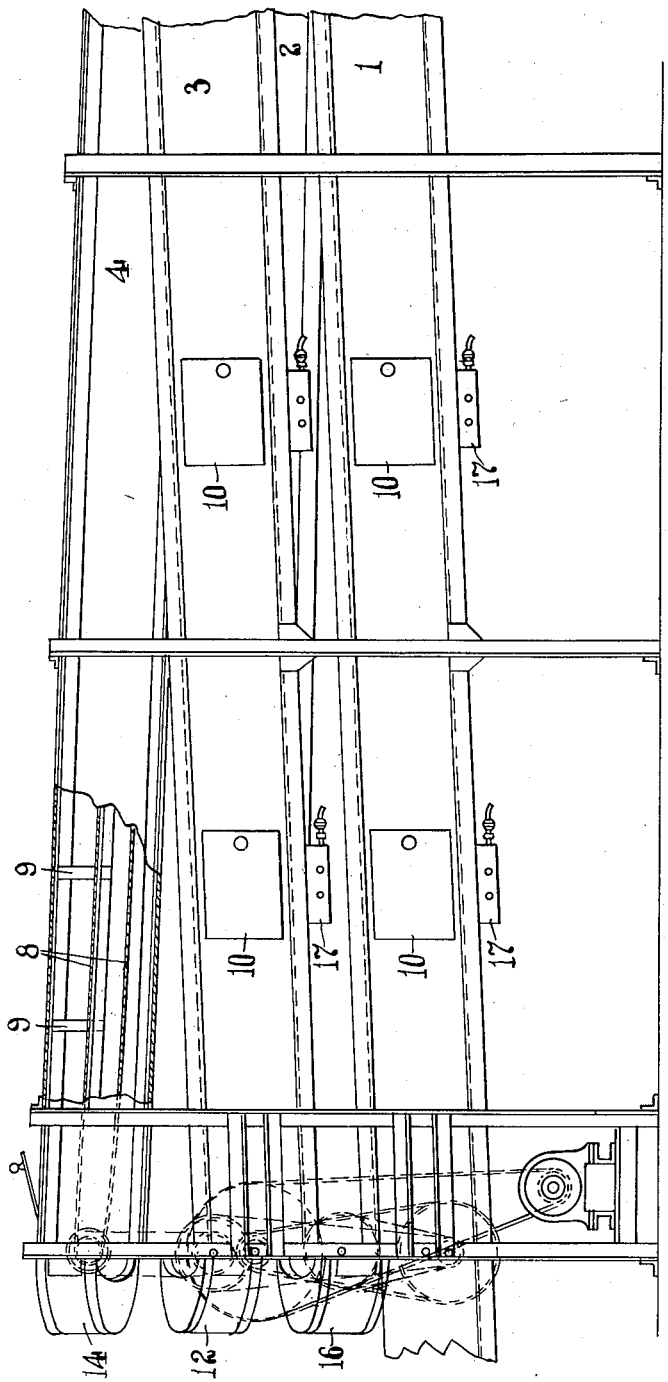

March 5, 1929.  R. L. FRINK  1,704,502
METHOD OF AND APPARATUS FOR ANNEALING GLASSWARE
Original Filed Dec. 12, 1925  3 Sheets-Sheet 1

INVENTOR.
Robert L. Frink
BY
Fay, Oberlin & Fay
ATTORNEYS.

March 5, 1929.  R. L. FRINK  1,704,502
METHOD OF AND APPARATUS FOR ANNEALING GLASSWARE
Original Filed Dec. 12, 1925   3 Sheets-Sheet 2

INVENTOR.
Robert L. Frink
BY
Fay, Oberlin & Fay
ATTORNEYS

Patented Mar. 5, 1929.

1,704,502

UNITED STATES PATENT OFFICE.

ROBERT LEONARDSON FRINK, OF LANCASTER, OHIO.

METHOD OF AND APPARATUS FOR ANNEALING GLASSWARE.

Application filed December 12, 1925, Serial No. 75,135, and in Great Britain December 13, 1924. Renewed August 8, 1928.

This invention relates to a method of and apparatus for annealing glassware, more particularly such as is intended for dealing with glass articles delivered by a glass moulding machine, that is to say, dealing with a number of similar glass articles heated to a high temperature and delivered into the annealing apparatus in succession, at substantially equal intervals of time.

The principal stresses in glassware to be relieved by annealing are those due to inequalities in the rate of cooling of different parts of the glass article in passing from the molten or plastic to the solid state, and those due to a lack of homogeneity in the composition of the glass itself, and therefore, in carrying out the process of annealing, it is desirable not to cool the article below its solidification temperature more than is necessary to ensure that it will maintain its form or shape, until after it has been placed in an atmosphere which is maintained at a temperature sufficiently high to relieve such stresses, and then to cool the article or to permit it to lose heat at a uniform rate throughout its bulk, at the same time taking care that the rate of cooling or loss of heat from the exterior of the article shall not exceed the rate at which heat within may be conducted to without or to the surface of the glass itself, which loss is determined by its specific heat conductivity. The temperature to which the glass should be brought before being allowed to cool finally and uniformly, is that which will permit sufficient freedom of movement to the molecules constituting the article so that little or no stresses exist in or between them.

This invention provides improved apparatus comprising a plurality of heating and cooling chambers arranged in succession through which the articles are conducted singly and spaced apart from each other, the atmosphere in the several chambers being thermally graduated so that each article is subjected to a prescribed temperature gradient whereby it attains a uniform and definite temperature, and so that the cooling or rate of loss of heat from each article can be controlled and maintained uniform and definite.

For reasons of economy of space the several chambers are preferably arranged side by side or one above another, suitable means being provided whereby each article as it reaches the delivery end of one chamber is transferred to the feed end of the next chamber, and so on through all the chambers.

The floors of the chambers may be inclined either upwardly or downwardly, as required. Thus, in a chamber, or a part thereof, in which the articles travel along an ascending path, the heated gas within this chamber travels in the same direction as the travel of the articles, due to the tendency of the gas to rise towards the higher end of the chamber; and for a like reason, when the articles travel along a descending path the heated gas travels in a contrary direction to that in which the articles are traveling, in either case the natural flow of the gas being utilized to assist in controlling the temperature of the atmosphere in the heating and cooling chambers.

To the accomplishment of the foregoing and related ends, the invention, then, consists of the means hereinafter fully described and particularly pointed out in the claims, the annexed drawing and the following description setting forth but one of the various ways in which the principle of the invention may be used.

Figure 2:
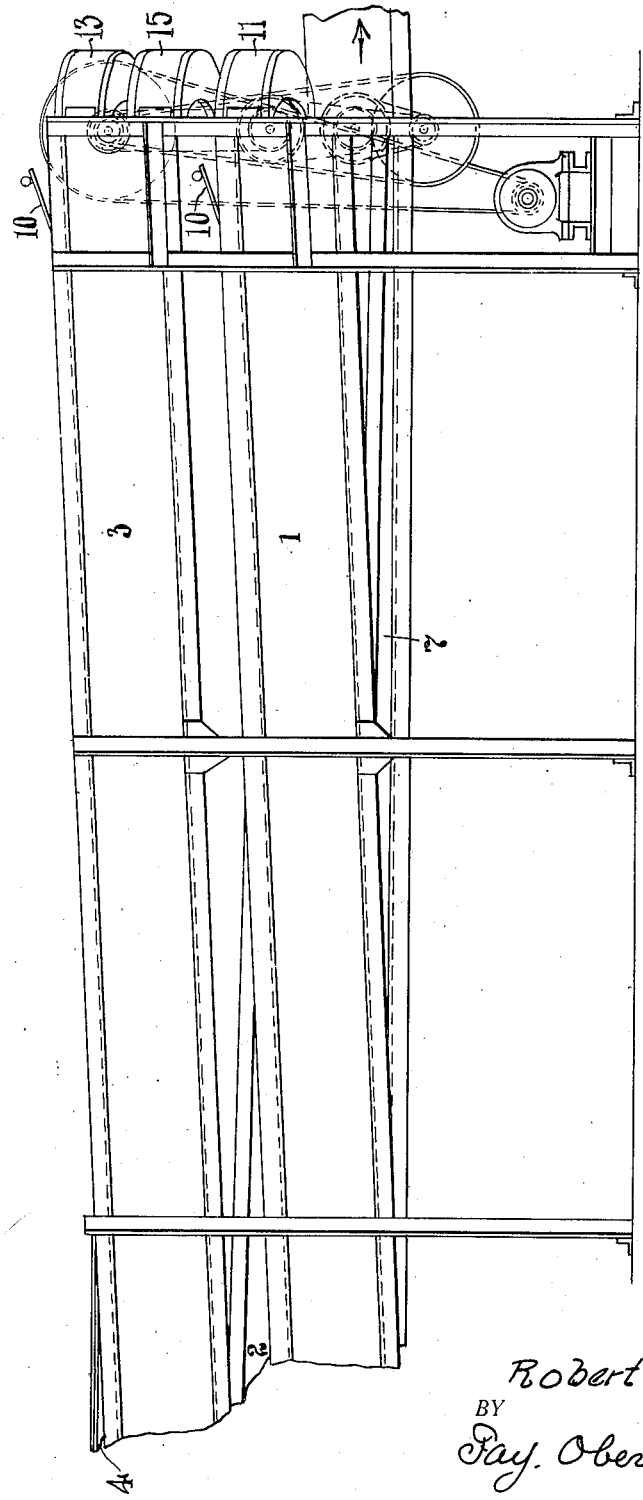
Figure 3:
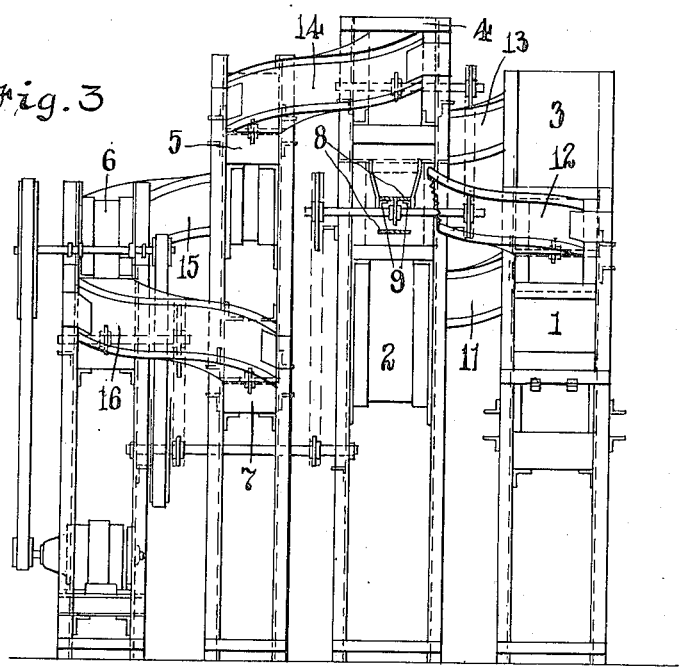
Figure 4:
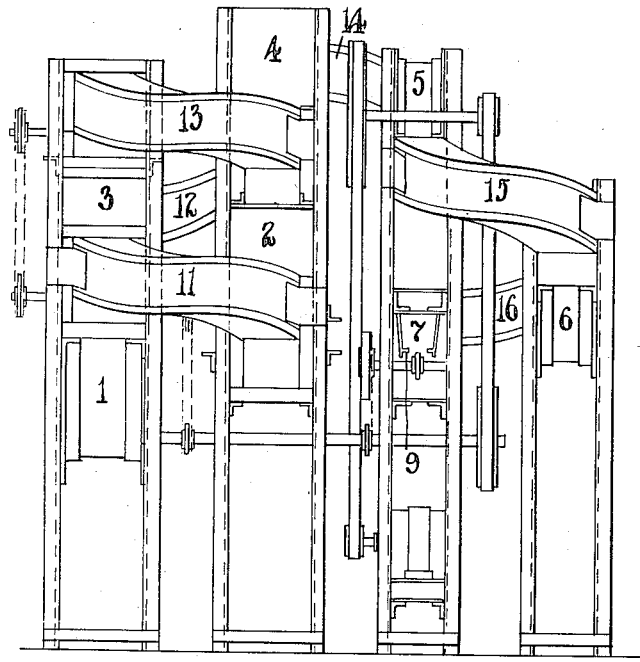

Fig. 1 is a side elevation of the feeding end; Fig. 2 is a side elevation of the delivery end of the improved apparatus for annealing glassware; Fig. 3 is a view in end elevation of the feeding end thereof with parts in section; and Fig. 4 is a similar view of the delivery end.

As shown in this drawing, 1, 2, 3, 4, 5, 6 and 7 are chambers through which the articles to be annealed are conducted singly upon a travelling belt or conveyor 8 supported by conveyor guides 9. The cross sectional form of the belt and the guides is shown in Fig. 3 at a part of the chamber 2 which is shown in section. The several chambers are inclined upwardly or downwardly as the case may be in the direction in which the articles are conveyed therethrough. In the arrangement herein described and illustrated in the drawings, of the seven chambers, 1, 2, 3, 4, 5, 6 and 7, through which the articles are passed, the first four slope upwardly in relation to the travel of the articles, the next two chambers slope downwardly, and the seventh or last is level. Any number of such chambers may be provided and disposed at angles according to the requirements as to rate of cooling of the articles, taking into consideration the speed of the conveyors by which the articles are carried through the successive chambers.

Openings are provided in convenient situations in the walls, floor or roof of each chamber and these openings can be closed wholly or in part by dampers, doors or valves 10 so that the rate of flow of heated air into or out of any of the chambers can be separately controlled, by reason of the natural tendency of the heated gases taking their heat from the articles on the belts or conveyors to rise to the higher end of each chamber. The rate of flow of the heated air or gas in each chamber can be separately controlled so that it flows more quickly than, at an equal speed to, or more slowly than the belt conveying the article.

The several chambers may be made with the delivery end of one chamber at the same level as the feeding or receiving end of the next chamber and close thereto so that the two chambers can be connected by a runway of any convenient construction for transferring the articles from one chamber to the next. In the arrangement illustrated in the drawings the delivery end of one chamber is set at a somewhat higher level than the feeding or the receiving end of the next chamber and then the runways between successive chambers are conveniently constructed with sufficient incline, to allow articles delivered on to the runway by one conveyor band to slide by gravity along the runway and be picked up by the conveyor belt of the next chamber. As illustrated the articles carried through the chamber 1 are transferred through the runway 11 to the chamber 2 and pass by the runway 12 to the chamber 3 and so on in succession through the chambers and runways in the following order, viz runway 13, chamber 4, runway 14, chamber 5, runway 15, chamber 6, runway 16, chamber 7, from which the final discharge of the articles takes place.

The articles to be annealed delivered to the annealing apparatus from a glass moulding machine in some instances provide sufficient heat for raising the articles delivered to the first chamber to an annealing temperature, that is to say, a temperature at which the glass although sufficiently cooled and solidified to retain its shape is nevertheless sufficiently plastic to allow the glass on coming to a uniform temperature throughout its bulk to relieve or relax all internal stresses due to unequal cooling. If the heat of the articles delivered from the moulding machine is insufficient to raise the first or any succeeding chamber to the desired temperature, the latter may be supplied with heated air from a furnace, or from gas burners 17, or the wall or the walls of this chamber may be heated externally, due regard being had to the fact that the result which it is desired to obtain while the article is passing through the first chamber (or in some cases the first two or three chambers), is that the article while retaining its finished shape should be brought into a sufficiently plastic condition, as above mentioned, and be brought to a uniform temperature throughout its bulk. Thereafter, in passing through successive chambers, the object which it is sought to attain, is the cooling of the article as quickly as possible without reducing its exposed surfaces to a very much lower temperature than that existing in the middle portions of the thickest parts of the article. The allowable difference between the surface temperature and the internal temperature is in some degree governed by the conductivity of the glassware under treatment, it being necessary to ensure that heat is not abstracted from the surfaces at a quicker rate than it can flow to the said surfaces from the mass of glass between them.

As above pointed out the rate of flow of the gas or air in the chambers 1, 2, 3 and 4 is in the same direction as the travel of the article and by means of the dampers or doors the rate of flow can be controlled so that it is greater, equal to or less than the rate of travel of the belt or conveyor. For example, assuming that heated air at a sufficiently high temperature is admitted at the lower end of chamber 1 and allowed to travel at a higher rate of speed than the articles towards the higher end of this chamber, the articles can be progressively and gradually raised in temperature. The same articles in moving through the chambers 2, 3 and 4 can be gradually and progressively cooled by admitting cooler air at the lower end of these chambers to abstract heat from the articles travelling in the same direction as the air current. The articles in passing downwardly through the chambers 5 and 6 in the opposite direction to the air currents are progressively cooled from the higher temperature at which they enter these chambers down to a temperature approximating to that of the air admitted at the lower ends of each chamber. This air can be preheated if this is found necessary or desirable.

The air in any of the chambers in which the said air by reason of the inclination of the chamber travels in the same direction as or in the opposite direction to the articles on the conveyor belt therein, may be arranged to reheat or cool the articles to be annealed by suitably regulating its rate of flow and controlling its temperature at the inlet to the chamber.

These chambers may be constructed with linings or coverings of heat insulating material suitably disposed to regulate the loss of heat by radiation and any of these chambers may be provided with suitable flame apertures, muffles, gas fuel burners or other heat generating means for controlling or obtaining any desired temperature of the atmosphere within the said chambers.

The apparatus enables the article to be discharged from the mould directly and immediately into a heated chamber with substantially no loss of heat from the article between the discharge from the mould to its entrance into the commencing part of the annealing apparatus, and thus the residual heat in the article is available for heating or assisting to heat the atmosphere surrounding the article and therefore also for bringing all parts of the article itself to a uniform temperature.

From the foregoing it will be apparent that any article to be annealed can first be raised to the desired temperature within the annealing apparatus and then uniformly cooled, the rate of cooling being controlled so as not to exceed the permissible limit hereinabove indicated.

Other modes of applying the principle of my invention may be employed instead of the one explained, change being made as regards the means herein disclosed, provided the means stated by any of the following claims or the equivalent of such stated means be employed.

I therefore particularly point out and distinctly claim as my invention:—

1. A method of annealing glassware, which comprises passing the glassware articles successively well spaced apart in a single line and substantially without loss of heat from the molding operation through an atmosphere of heated gas, and then progressively cooling.

2. A method of annealing glassware, which comprises passing the glassware along with a rising current of heated gas, then further passing it through a countercurrent of progressively cooler gas.

3. A method of annealing glassware, which comprises passing the glassware along with a rising current of heated gas, then further passing it downwardly through a rising current of progressively cooler gas.

4. A method of annealing glassware, which comprises passing the glassware from the mold substantially without loss of heat into a rising current of heated gas, then further passing it through a current of progressively cooler gas.

5. An annealing apparatus for glassware which comprises a series of upwardly inclined chambers, a series of downwardly inclined chambers, means for conveying the glassware through said chambers, and means for controlling the flow of gases independently through said chambers.

6. An annealing apparatus for glassware, which comprises a plurality of chambers, conveyors travelling progressively in said chambers, means for heating one of the chambers, and means for controlling the flow of gases through said chambers.

7. An annealing apparatus for glassware, which comprises a series of upwardly inclined chambers, a series of downwardly inclined chambers, means for conveying glassware progressively through said chambers, and means for heating one of the chambers.

8. An annealing apparatus for glassware, which comprises a series of upwardly inclined chambers, a series of downwardly inclined chambers, runways connecting adjacent chambers, means for conveying glassware progressively through said chambers, and means for heating one of the chambers.

9. An annealing apparatus for glassware, which comprises a series of upwardly inclined chambers, a series of downwardly inclined chambers, runways connecting adjacent chambers, conveyors travelling progressively in said chambers, and means for heating one of the chambers.

10. An annealing apparatus for glassware, which comprises a series of upwardly inclined chambers, a series of downwardly inclined chambers, runways connecting adjacent chambers, conveyors travelling progressively in said chambers, means for heating one of the chambers, and means for controlling the flow of gases through said chambers.

Signed by me this 11 day of December, 1925.

ROBERT LEONARDSON FRINK.